United States Patent
Stevenson et al.

(10) Patent No.: US 10,506,555 B2
(45) Date of Patent: Dec. 10, 2019

(54) SYSTEM AND METHOD FOR IDENTIFYING AND USING AN OPTIMUM SHARED SPECTRUM SEGMENT AS A DELAY TOLERANT, LOW DUTY-CYCLE, COOPERATIVE COMMUNICATION MEDIUM FOR TERRAIN INDEPENDENT CONNECTION

(71) Applicant: Rurisond, Inc., Mountain View, CA (US)

(72) Inventors: Robert S. Stevenson, Redwood City, CA (US); Thomas A. Riddle, Belmont, CA (US)

(73) Assignee: Rurisond, Inc., Mountain View, CA (US)

( * ) Notice: Subject to any disclaimer, the term of this patent is extended or adjusted under 35 U.S.C. 154(b) by 89 days.

(21) Appl. No.: 15/721,623

(22) Filed: Sep. 29, 2017

(65) Prior Publication Data

US 2018/0110030 A1 Apr. 19, 2018

Related U.S. Application Data

(60) Provisional application No. 62/408,498, filed on Oct. 14, 2016.

(51) Int. Cl.
*H04W 72/02* (2009.01)
*H04W 72/04* (2009.01)
(Continued)

(52) U.S. Cl.
CPC .......... *H04W 72/02* (2013.01); *H04W 16/14* (2013.01); *H04W 72/0453* (2013.01);
(Continued)

(58) Field of Classification Search
CPC . H04W 16/14; H04W 72/0453; H04W 24/02; H04W 24/08; H04W 64/006;
(Continued)

(56) References Cited

U.S. PATENT DOCUMENTS

| 8,041,380 B2 | 10/2011 | Hamdi et al. |
| 8,315,663 B2 | 11/2012 | Hamdi et al. |

(Continued)

OTHER PUBLICATIONS

Cognitive Radio, Wikipedia, retrieved from: https://en.wikipedia.org/wiki/Cognitive_radio on Aug. 22, 2017, 7 pages.

(Continued)

*Primary Examiner* — Golam Sorowar
(74) *Attorney, Agent, or Firm* — Jennifer Hayes; Nixon Peabody LLP

(57) ABSTRACT

Establishment of a Terrain Independent Communication using—The HF band (3-30 MHz) and VHF (30 to 300 MHz) frequency spectrums that is provided for use as shared spectrum by the FCC. Different segments within the spectrum are in use today by emergency and utility companies in an intermittent fashion. The utilization of the shared spectrum as of date is very low (typically below 20%). The invention seeks to identify optimum, and less frequented frequency ranges within the spectrum to establish terrain independent connectivity between base stations and end points up to 1200-mile radius. This connection is used to provide terrain independent communication for data communication for point to point and point to multi-point applications. Typically, this connection is used for short bust automatic data acquisition applications, such as sensor monitoring, and other communication applications.

31 Claims, 6 Drawing Sheets

(51) Int. Cl.
*H04W 16/14* (2009.01)
*H04W 72/10* (2009.01)
*H04L 27/00* (2006.01)
*H04W 40/04* (2009.01)

(52) U.S. Cl.
CPC ......... *H04W 72/10* (2013.01); *H04L 27/0006* (2013.01); *H04W 40/04* (2013.01)

(58) Field of Classification Search
CPC ... H04W 88/08; H04W 72/04; H04W 72/042; H04W 72/085; H04W 52/241; H04W 52/42; H04W 28/06; H04W 40/04; H04W 52/265; H04W 72/044; H04W 4/029; H04W 4/02; H04W 72/0446; H04B 17/318; H04B 17/309; H04B 17/27; H04B 7/0417; H04B 7/0443; H04B 7/0456; H04B 17/23; H04B 17/26; H04B 17/3911; H04B 17/24; H04B 17/29; H04L 5/0007; H04L 27/26; H04L 27/2602; H04L 27/2605; H04L 27/2607; H04L 27/2646; H04L 5/0044; H04L 5/005; H04L 27/0006; H04L 5/0064; H04L 67/04

See application file for complete search history.

(56) References Cited

U.S. PATENT DOCUMENTS

| | | | |
|---|---|---|---|
| 8,521,094 B2 | 8/2013 | Hamdi et al. | |
| 8,831,520 B2* | 9/2014 | Demessie | H04W 16/14 370/328 |
| 8,867,521 B2 | 10/2014 | Hakola et al. | |
| 9,232,514 B2 | 1/2016 | Koskela et al. | |
| 9,300,394 B2 | 3/2016 | Pandharipande et al. | |
| 9,357,399 B2 | 5/2016 | Kwon et al. | |
| 2005/0227625 A1 | 10/2005 | Diener | |
| 2009/0003201 A1* | 1/2009 | Horvitz | H04L 41/0896 370/229 |
| 2009/0046625 A1 | 2/2009 | Diener et al. | |
| 2010/0081449 A1* | 4/2010 | Chaudhri | H04W 72/082 455/452.2 |
| 2010/0136989 A1 | 6/2010 | Westerberg et al. | |
| 2012/0125772 A1 | 5/2012 | Stetter et al. | |
| 2013/0039315 A1* | 2/2013 | Jo | H04B 15/00 370/329 |
| 2014/0242981 A1* | 8/2014 | Hassan | H04W 72/0453 455/434 |
| 2015/0189528 A1* | 7/2015 | Carbajal | H04W 24/08 370/252 |
| 2016/0088486 A1* | 3/2016 | Taher | H04W 16/14 455/454 |
| 2018/0103473 A1 | 4/2018 | Stevenson et al. | |

OTHER PUBLICATIONS

Band Sharing in Public Sector Spectrum—Negotiating Rights for Commercial Use, Analysis Mason, White Paper, 4 pages.
Spectrum Database Help, Google, 2016, retrieved from: https://support.google.com/spectrumdatabase/?hl=en on May 6, 2016, 7 pages.
Matheson et al., The Technical Basis for Spectrum Rights: Policies to Enhance Market Efficiency, Brookings, 2011, pp. 1-55.
Peha, J.M., Approaches to Spectrum Sharing, Regulatory and Policy Issues, IEEE Communications Magazine, 2005, pp. 10 and 12.
Peha, J.M., How America's Fragmented Approach to Public Safety Wastes Money and Spectrum, 33rd Telecommunications Policy Research Conference, 2005, pp. 1-18.
TAC Radios, Multi-Service Tactics, Techniques and Procedures for Tactical Radios, Army, Marine Corps, Navy, Air Force, 2013, 144 pages.

* cited by examiner

SYSTEM AND METHOD FOR IDENTIFYING AND USING AN OPTIMUM SHARED SPECTRUM SEGMENT AS A DELAY TOLERANT, LOW DUTY-CYCLE, COOPERATIVE COMMUNICATION MEDIUM FOR TERRAIN INDEPENDENT CONNECTION

CROSS-REFERENCE TO RELATED APPLICATIONS

This application claims priority to U.S. provisional application Ser. No. 62/408,498, filed Oct. 14, 2016, entitled "SYSTEM AND METHOD FOR IDENTIFYING AND USING AN OPTIMUM SHARED SPECTRUM SEGMENT AS A DELAY TOLERANT, LOW DUTY-CYCLE, COOPERATIVE COMMUNICATION MEDIUM FOR TERRAIN INDEPENDENT CONNECTION," the entirety of which is hereby incorporated by reference.

BACKGROUND

1. Field

The present disclosure relates to a system and method for using shared frequency spectrum to enable terrain independent communication and control capability for communication in remote locations.

2. Related Art

In the past frequency spectrum use was controlled by allocation by the government. Such a system of allocation has resulted in most of the usable spectrum for communication being allocated to specific licensees for their use. Of recent the need for spectrum use has gone up due to the prevalence of handheld communication devices, and accelerated development of connected homes and IoT. Currently though the cellular network bands are overloaded, other frequency band's frequencies are utilized very sparsely and inefficiently. Further the fixed spectrum allocation, by assigning some frequencies to specific applications such as emergency management, fire control etc., prevent these rarely used frequencies from being used by unlicensed users, even when the unlicensed users would not cause any disruption to the services to which these bands of frequencies are allocated. This has led to wide spread complaints of spectrum shortage and the push to share spectrum for communications. Studies have shown that much of the prized spectrum is idle at any given instant and location. The shortage comes from outdated spectrum policies that allow little sharing. Regulators grant licenses that offer exclusive access to spectrum. When licensees are not transmitting, spectrum sits idle.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The development of sensors that can be remotely monitored and controlled has enabled new applications that need to use available frequency spectrum to communicate to remote locations, over a plurality of terrain types, as an example for applications in agriculture, such as monitoring the moisture in cultivated fields and enabling the sprinklers to turn on only when necessary for the required amount of water dispensing (helping to conserve water resources). Other similar applications exist in avalanche and earthquake propensity monitoring and many other fields.

It will be ideal if the unused spectrum, when available, can be shared for such applications, especially if it can be done without impacting the allowed primary use of the spectrum. The spectrum sharing by the secondary user will have to be opportunistic when the primary user is not using the spectrum. The secondary user will have to have the capability to recognize the arrival of a primary user over the spectrum used and move to a different segment of the shared spectrum for continued operation. Through signal processing and other techniques, the secondary user should be able to determine when a portion of the shared spectrum is available for use and when a primary is present mandating move to another spectral range that is empty.

A system and method to use the sharable spectrum in an efficient fashion is disclosed, the system and method comprising sharing with primary users for terrain independent communication for control of sensor arrays used in many remote applications.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
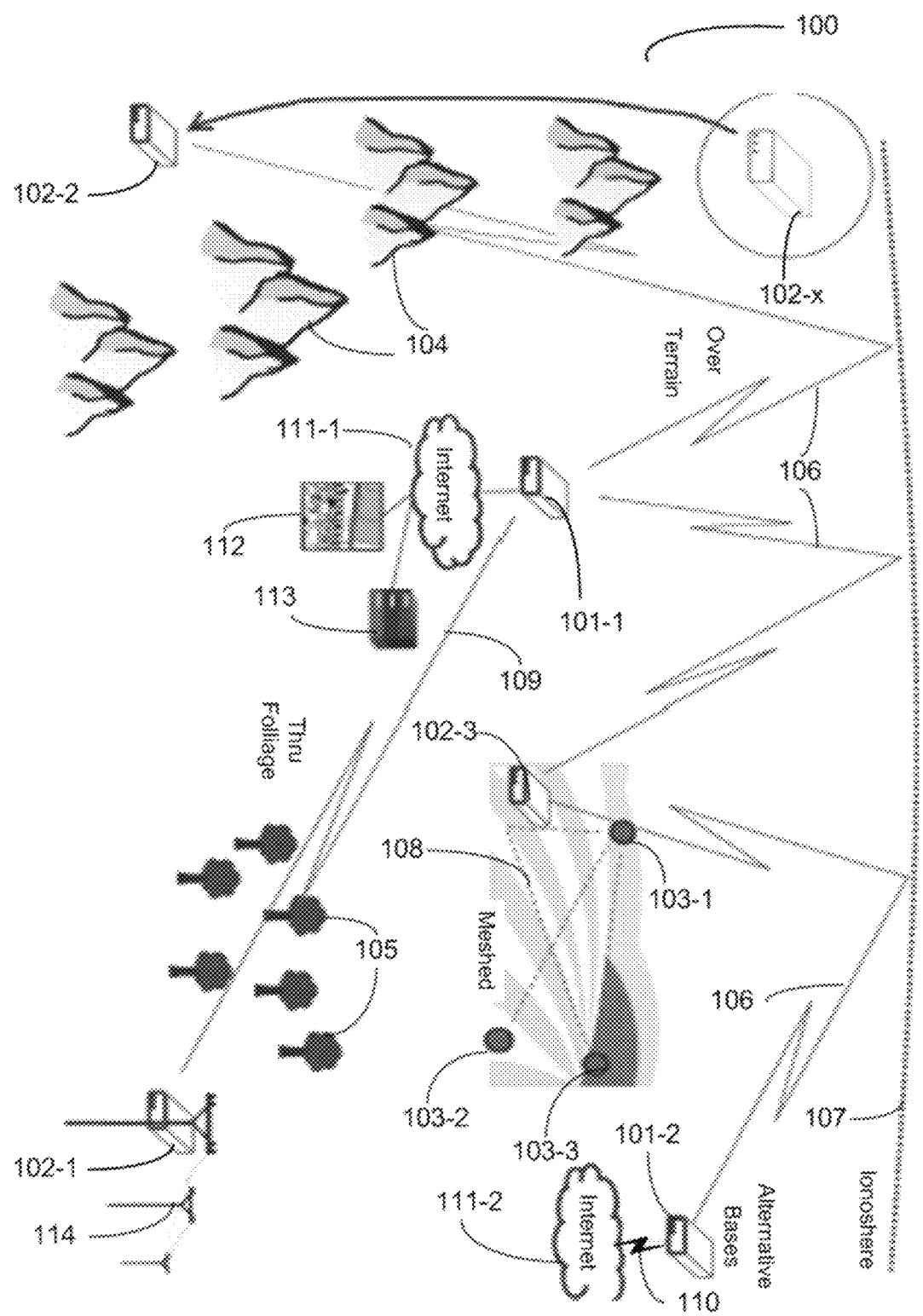
FIG. 1 is a block diagram of the system in accordance with an embodiment of the invention.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

ER=endpoint radio
BR=base radio
IS=Initiating Station
RS=Responding Station
Probe Process=a Narrowband signal channel and protocol used by a station to advertise its existence and perform initial set up Configuration Process=a narrow (but probably wider than the probing process Channel) signal channel and protocol used by two stations to configure the link between them and identify and schedule a Data Channel for information transfer.

Narrowband or narrow signal=a channel that has a frequency response that is flat due to the narrow spectrum of frequencies (narrow bandwidth which concentrates the transmit power) and the spectrum used being just sufficient to handle the data reliably rather than the total available band. In one embodiment, the narrowband signal is any value or range of values between about 5 Hz and about 500 Hz. It will be appreciated that the signal may also be less than 5 Hz or greater than 500 Hz.

Bearer Process=Establishes an end to end data pipeline or data channel for data traffic between Radios.

Bearer Channel=a channel used to actually transmit and receive data.

Note: In this invention a channel might actually be a list of channels to use for one of the three purposes listed above. If a channel is found to be unusable (due to noise, existence of other users using the channel or other reason) then another channel in the vector is tried.

Call sign=a short address assigned by a Base Station. It is unique within a Base Station. This address is used in radio communications.

Key=A short identifier assigned by a base Station. It is unique within a Base Station connection. This address is always encrypted. It is used to validate the identity of a calling station.

Note: The Call sign and Key are supplied during establishment of a connection and during reconnect.

Software defined Cognitive Radios are radios whose operation is defined by software and which can operate in an intelligent and autonomous fashion; this radio specifically has the capability to scan the frequency spectrum for usage and interference with little or no manual interaction. The invention is made feasible and economical with cognitive radios.

The cognitive radio has a cognitive engine that is capable of intelligently configuring the software defined radio-system parameters. These parameters include waveform, protocol, operating frequency, and networking. This functions as an autonomous unit in the communications environment, exchanging information about the environment with the networks it accesses and other cognitive radios (CRs). A CR monitors its own performance continuously, in addition to reading the radio's outputs; it then uses this information to determine the RF environment, channel conditions, link performance, etc., and adjusts the radio's settings to deliver the required quality of service subject to an appropriate combination of user requirements, operational limitations, and regulatory constraints.

Sensing based Spectrum Sharing=A radio first listens to the spectrum to identify primary use and based on the result chooses unused frequency bands to transmit over.

GROUNDWAVE (GW)=Radio waves that generally follow the along the ground. Usage targeted for clustering close proximity systems of Distance 0-30 Miles, using a Frequency range of 2-30 Mhz, and having high availability with spectrum independence. Lower frequencies propagate further, terrain dependent, ground losses impacts performance, best for non-urban, non-mountainous application.

Near Vertical Incidence Skywave (NVIS)=Frequency transmission lobe directed vertically for near distance coverage. The NVIS usage is mainly for short to medium haul distances up to 400 Miles, using a frequency range 2 to 12 Mhz is terrain independent transmission, optimum performance seen at critical frequency (CF), Critical frequency changes throughout the day; this change needs to be tracked by the invention.

Meteor Burst/Scatter (MB/S)=Transmission depends on the ionization due to decay of micro-meteors in the outer atmosphere. Usage: medium-long haul distances of 200-1200 Miles using a frequency range of 40-140 Mhz. The transmission capability varies and depends on seasonal and daily characteristics of the channel. Transmission is terrain independent.

Establishment of a Terrain Independent Communication using the shared HF band (3-30 MHz) and VHF (30 to 300 MHz) frequency spectrum that is provided for secondary use as shared spectrum by the FCC. Different segments within the spectrum are in use today by the groups assigned as primary users of the spectrum, such as emergency and utility companies, in an intermittent fashion. The utilization of the shared spectrum as of date is very low (typically below 20%). The invention seeks to identify optimum, and less frequented frequency ranges within the spectrum to establish connectivity between base stations and end points within a 20 to 1200 mile radius eg. GW up to 30 miles, NVIS up to 400 miles and MB/S from 200 to 1200 miles, and to do so while avoiding Primary Users. This type of connection is used to provide a terrain independent communication for data communication for point to point and point to multi-point applications. Typically, this connection is used for short bust automatic data acquisition applications, such as sensor monitoring, such as for agricultural moisture monitoring.

Embodiments of the invention solve a critical problem in the Internet of Things (IoT) and two way communications to remote machines. Two way connections to remote devices and machines outside the cellular coverage are difficult to set up, unreliable and expensive. The only available connection in remote areas is by using the satellite communications or custom networks both of which are cumbersome and expensive. Connections enabled by the disclosed technology will enable short range to very long range connection capability, will be reliable, easy to install and manage. The differentiation from prior art includes:
1. Terrain independent communication using shared band.
2. Terrain specific two-way communication.
3. High reliability short burst communication capability.
4. Redundant channel selection possible.
5. Predictable communication capability.
6. Not allocated band dependent.
7. Unlike high cost satellite communication, the current system does not require high cost satellite connections.
8. Easy automatic or manual set up and configuration for data transfer.
9. The range and reliability are mainstays of the invention, not speed of communication.
10. Fully automatic, autonomous operation requiring no human intervention or control.
11. This includes automatic detection of the presence of primaries and the execution of avoidance techniques to find alternative spectrum on the fly.

Purpose built software defined radios (SDR)s are used as base station radios (BR)s and end point radios (ER)s. The SDRs are highly frequency and protocol agile. The SDRs are self-organizing and rugged to operate in remote locations. The SDRs are also remotely manageable over the wireless connections.

Embodiments of the invention share the unusable or unused/marginally used spectrum that is available for use for digital control and communication. The marginally used shared spectrum will be continuously probed to identify and catalogue the available free spectrum. Using information that is publically available and also by evaluating the results of the probing to identify the best channel and the optimum frequency spectrum available for that channel that is free of any primary users for use under the existing conditions is chosen for communication between the BR and ER.

Embodiments of the invention may be used for control and communication applications that are used to monitor and control sensors in difficult terrain. Embodiments of the invention allow the secondary users to use the shared frequency spectrum that is sparingly used by the primary users to whom it is allotted, when the primary user is not using the specific channel for communication. This requires the secondary user to identify unused frequency bands and choose both an optimum channel and the available optimum frequency spectrum to link BR 101 to the ER 102 to establish a reliable communication network. The use of this system and method are mainly in applications that are not highly time sensitive such as, for example, monitoring the water content of the soil using sensors in agricultural fields. Other exemplary environmental monitoring applications of embodiments of the invention include, for example, detection and intimation of wind and fire danger in forest conditions etc., and monitoring for tremors and earthquakes in remote locations, etc. Other exemplary applications include lower cost replacement for satellite communication in power grid monitoring and control for power generation, transmission and distribution, such as monitoring and managing distributed equipment for optimization of power transfer capabilities where distributed power generation, and distributed storage as well as power flow management has to be done to keep the grid operating efficiently. Other exemplary applications include cost effective monitoring and management of smart meters in the IoT and in hard to reach locations in the electrical distribution grid. Although embodiments of the invention have been described as being particularly applicable to time insensitive applications over harsh terrain, a person of skill in the art will recognize that the invention is not limited to such applications and provides advantages to wireless communications generally.

In order to be deployed in remote locations, the BR and ER are ruggedized. The ruggedization ensures that the radios are designed and tested to withstand and operate reliably and efficiently under the worst case environmental conditions at the remote locations where they are deployed. For example, the BR and ER may be designed to provide better resistance to wear, stress, and abuse and are designed to withstand harsh climatic conditions), be small in size (slightly larger than standard routers), of low cost for use with standard sensor technology and also have low power usage. The ruggedized radios are tested to confirm they meet rugged design criteria. Though these and other requirements are necessary for wide system adoption in remote applications and are some of the unique capabilities of embodiments of the invention, it is not mandatory for the use of the invention in the mass market applications that may exist, where cost of implementation is the main acceptance criteria.

Three different route types of communication capabilities are included within both the BR and ER to enable and enhance the terrain independent nature of the communication process. These route types include ground wave transmission and reception, which has an effective range of up to 30 miles, Near Vertical Incidence Sky-wave (NVIS) which has a range of up to 400 miles, and Meteor Burst/Scatter (MB/S) which uses scatter from the ionized layer of the atmosphere and can cover distances of 200 to over 1000 miles based on the conditions of the ionized layer.

Other techniques, such as Elayer, Tropospheric propagation and Gray line propagation, may also be included within the BR and ER for similar purposes to establish bearer channels for shared spectrum communication.

One of the requirements for shared spectrum is that any secondary spectrum use has to be only when primary users are not using that spectral band. During the use of any shared spectrum by the secondary users, if a primary user appears, the secondary user has to vacate that frequency band and move to another unused frequency band. Embodiments of the invention are able to move communication to alternate frequency band on identification of any primary user in the current frequency band by keeping track of all available free spectrum and continuously identifying a second and third usable free frequency bands to which the communication can move.

In addition, the ERs are able to be used as two-way relay stations and remain in contact with neighboring BRs and ERs during operation. Each interconnected BR and ER is enabled to probe the frequency bands continuously, such that any primary identified by any of the interlinked BRs and ERs enable the system to vacate that band on which a primary is detected at any time.

FIG. 1 is a diagrammatic representation of the system 100 according to one embodiment of the invention. The Radios BR 101 and ER 102 are similar in nature and have the capability to both transmit and receive information. This allows any radio in the system to act as a BR or ER depending on system configuration.

FIG. 1 shows the Base radios BR 101-1 and BR-101-2 both connected to outside network through internet 111-1 and 111-2 respectively. The connection to the internet can be through wired router 113 or through wireless connection 110. The control of the system may be through a GUI 112 connected to the BR-101-1 or through a connected remote server (not shown).

The ER 102-1 is shown as being at inaccessible location through vegetation that limit the capability of normal communication systems. The system is shown as being connected using ground waves 109 with a shared frequency range of 2-30 MHz. It is being shown as being used to control distributed flow controllers associated with the power grid 114 over difficult terrain.

The ER 102-2 is shown also as being at an inaccessible location for easy and cheap connection using currently available normal communication channels in a mountain range 104. The invention enables the connections using shared spectrum in the 2-12 MHz range using NVIS transmission that is terrain independent and can cover distances up to a 400-mile radius depending on the channel characteristics.

Any distance coverage that is longer than 400 miles will be preferably by use of MB/S 107 from the inosphere 107 as shown connecting the BR 101-1 and the alternate BR101-2 to the ER 102-3. The distances covered in this case can be between a 200 mile to 1,200 mile radius from the transmitting station.

It is expected that a single ER 102-3 will be able to monitor and control a plurality of sensors 103-1 to 103-3 in an area that are interconnected 108 in a mesh form for communication and control.

Typically, cellular coverage is very limited in distance and as data volumes increase the cost also goes up. Also cellular coverage is unavailable/unusable in most of these areas where these sensors are installed. So, the existing cellular implementations are not a good fit for the sensor monitoring and control applications or other communication requirements over difficult terrain. Use of satellite coverage is reliable for distances and over terrain but the cost per data unit is very high, so that it becomes non-viable for applications that are cost sensitive. The system and method of embodiments of the invention use shared spectrum comprising the three route types and only short bust transmissions over narrow spectrum to provide a very cost effective and efficient capability for time insensitive applications over very inhospitable terrains for sensor monitoring and control application.

Embodiments of the invention use a hierarchical method to establish connection and continue communication under adverse conditions. The initial process of identifying and establishing connections between the BR and ERs are slow as the channel conditions are unknown. As the channel conditions become known or they improve a more robust connection is established which can speed up the communication. If the route or channel conditions deteriorate due to any reason the communication speeds are brought down to ensure reliable connection and communication capability is maintained. The system itself is enabled to adjust to the conditions of the channel during setup and communication to provide optimum connection capability.

Figure 2:
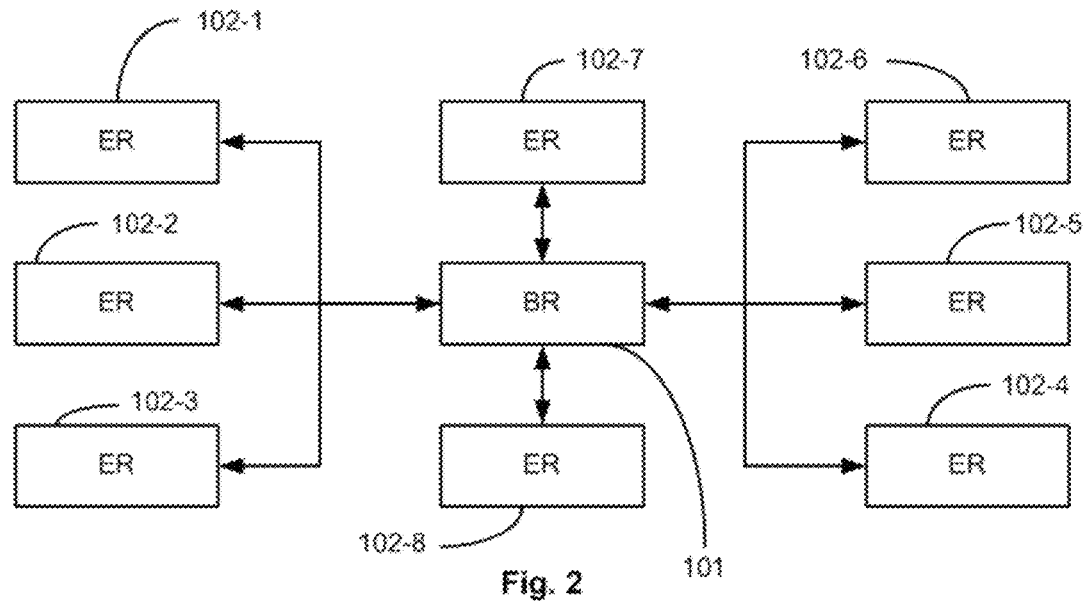
FIG. 2 is an exemplary star connected implementation of the blocks of the Base Station Radio (BR) and End Point Radios (ER)s in accordance with an embodiment of the invention.

FIG. 2 is an example of a star network connection topology used to establish connectivity between the base station radio (BR) 101 and the plurality of end point radios (ER)s 102-1 to 102-8. Base station radio 101 is connected to each of the end point radios 102-1 to 102-8 in a star network topology 200 A.

Figure 3:
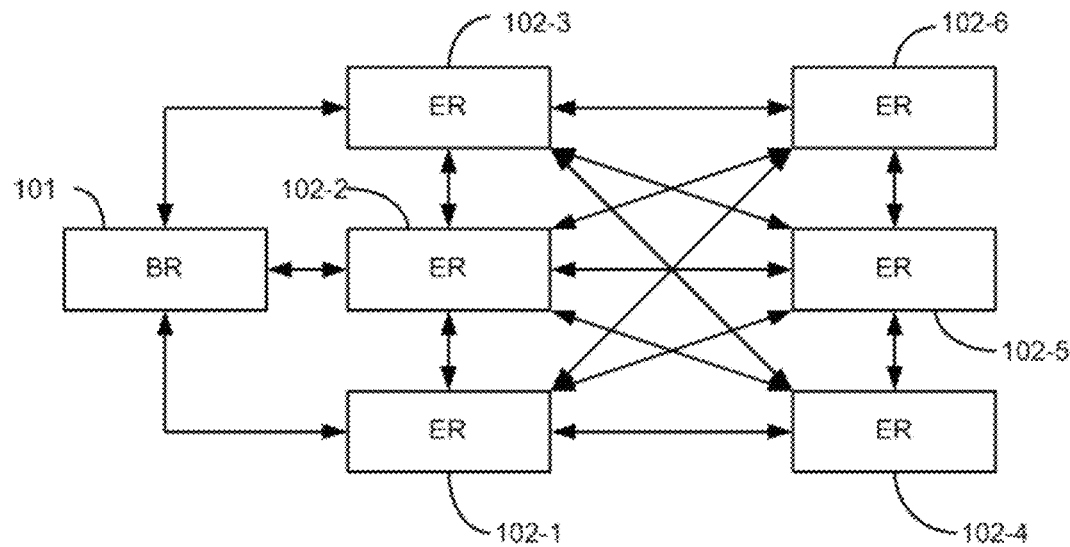
FIG. 3 is an exemplary mesh connected implementation of the blocks of the Base Station Radio (BR) and End Point Radios (ER)s in accordance with an embodiment of the invention.

FIG. 3 is an example of a mesh network connection topology 200B. This is a much more powerful topology allowing the base station radio (BR) 101 to connect to any one or more of the end point radios 102-1 to 102-3 which in turn is able to provide connection to all the other ERs 102-4 to 102-6 in the network, for communication and control.

Embodiments of the invention are able to handle a star, mesh or a hybrid network topology that combines star and mesh networks to provide connectivity.

In addition, the sensors that are connected and controlled by the ERs can also be connected in a star or mesh or hybrid topology.

Figure 4:
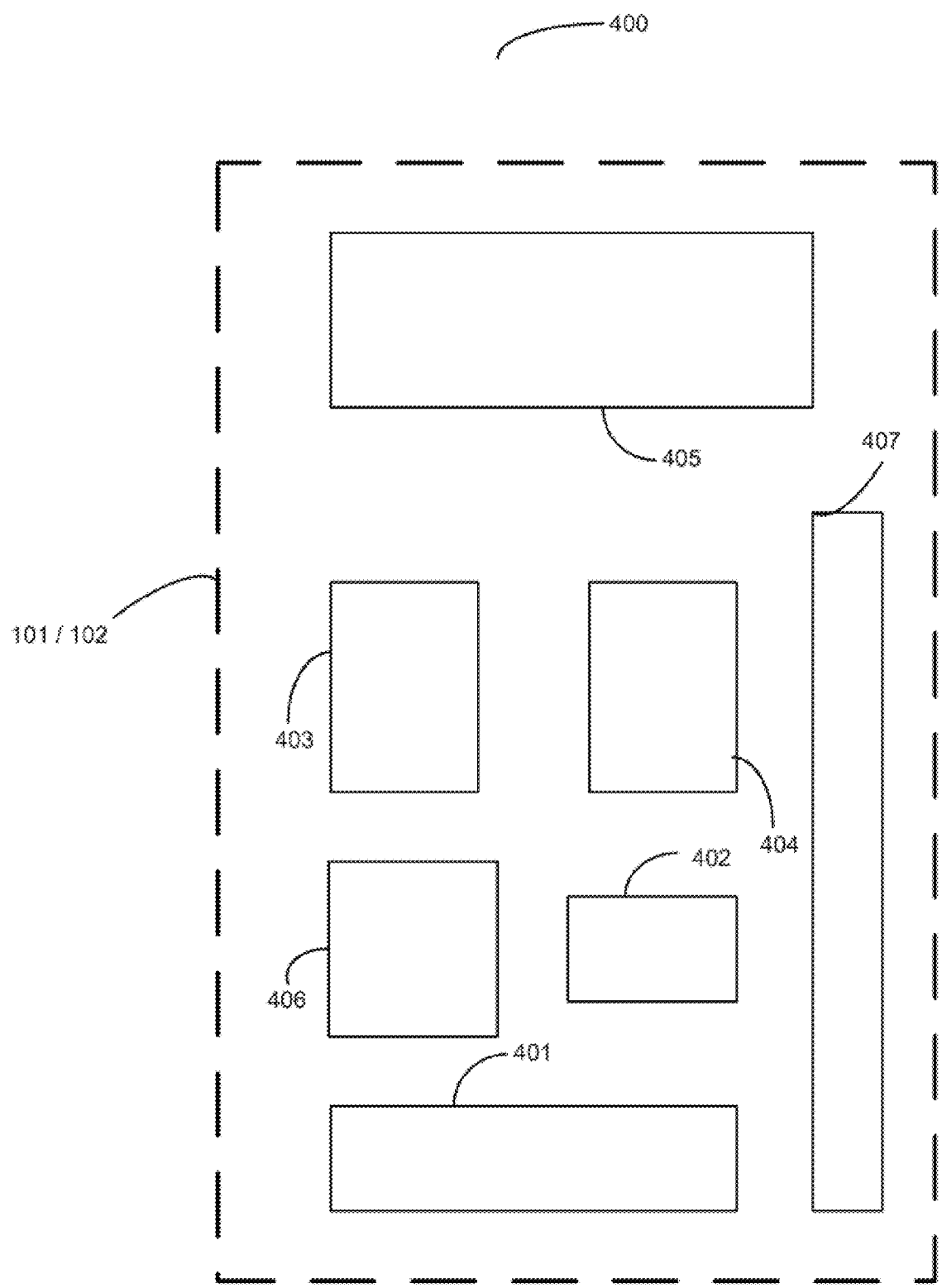
FIG. 4 is an exemplary block diagram 400 of the components of the radio system used either as a BR or an ER in accordance with an embodiment of the invention.

FIG. 4 shows an exemplary block diagram of the cognitive radio system 400 used as both BR 101 and ER 102. The radio system 400 includes an input/output interface 401, a management block 402, a control block 403, a communication platform 404, a software defined radio 405, a storage module 406, and a processing module 407. It will be appreciated that the radio system 400 may include additional or fewer components and that the interconnections of the components shown in FIG. 4 may differ.

The input/output interface 401 can be configured to receive and transmit data in analog or digital form over communication link(s) such as a serial link, wireless link (e.g., infrared, radio frequency, and/or others), parallel link, and/or another type of link (e.g., Ethernet, WiFi, USB, etc.). The input/output interface 401 is for connecting to the sensors in the case of the ERs 102. In the case of the BRs 101, the input/output interface 401 may be used for connecting to a user interface for input and output via WiFi or to a connected GUI at the location of the BR 101.

The management block 402 includes a network data interface manager that enables the radio system to be connected to the internet for data input for control and configuration of the systems. The management block 402 also includes a primary supervisory manager that oversees and monitors the overall system activity.

The control block 403 includes a system control unit, a modulation control unit, a frequency and spectrum control unit or spectrum manager and an antenna control unit. The frequency and spectrum control unit is configured to continuously probe and identify the free spectrum available and its characteristics, for use in each of the routes for establishing connection between BR 101 and ERs 102, or between the plurality of ERs 102. The spectrum manager is coupled to the storage module 406.

The communication platform 404 includes a session manager and a link manager to control the actions of the radio system to establish connections to the other radio systems 101 and 102. The communication platform enables the system to perform the required setup and control of the communication channel chosen for the connection.

The software defined radios 405 form the communication link that are capable of operating over all the route frequencies of the shared spectrum complete the radio system 400. The software defined cognitive radios 405 are a collection of hardware and software technologies where some or all of the radio's operating functions (also referred to as physical layer (PHY) processing) are implemented through modifiable software or firmware operating on programmable processing technologies. These devices include field programmable gate arrays (FPGA), digital signal processors (DSP), general purpose processors (GPP), programmable System on Chip (SoC) or other application specific programmable processors that include computer readable medium for executing the software for performing the radio's operating functions.

The storage module 406 may include data storage components such as read-only memory (ROM), programmable ROM, erasable programmable ROM, random-access memory (RAM) such as static RAM (SRAM) or dynamic RAM (DRAM), or the like, or combinations thereof. The storage module 406 may include, or may constitute, a computer-readable medium. The storage module 406 may store the instructions, code, code segments, software, firmware, programs, applications, apps, services, daemons, or the like that are executed by the processing module 407. The storage module 406 may also store settings, data, documents, sound files, photographs, movies, images, databases, and the like.

The spectrum manager in the control block 403 keeps track of the available shared spectrum with time stamps and the channel characteristics and stores the collected information in the storage module 406 as historic data. The historic data stored in the storage module 406 is continuously updated with frequency usage information of the primary and secondary users identified and the free channel availability data as well as the characteristics of the route and the spectrum. This data is used when choosing a transmission frequency for connection from a BR 101 to a ER 102 or connection between to ERs 102. The data stored is also used when a primary user is identified on a channel frequency that is being used by the system, to change over to an alternate frequency that can provide the needed reliable communication capability between the two radio systems BR 101 to ER 102 or two ERS 102s, one ER 102 acting as a repeater, connected for communication and control.

The processing module 407 is a processor that provides the processing power needed to the cognitive radio 400. The processing module 407 may contain one or more processing units. In embodiments in which the processing module 407 includes multiple processing units, each processing unit may be designed for a specific task. Alternatively, the processing module 407 may contain a general purpose processing unit. In yet another embodiment, the processing module 407 may contain multiple general purpose processing units that share processing for tasks in a mutual way.

The processing module 407 provides the intelligence and the processing power for the cognitive radio system 400 to handle the identification, selection and connection using the optimum route and the channel frequency available within the route for connection and communication between the BR 101 and ER 102 automatically once the radio system 400 is configured.

Figure 5:
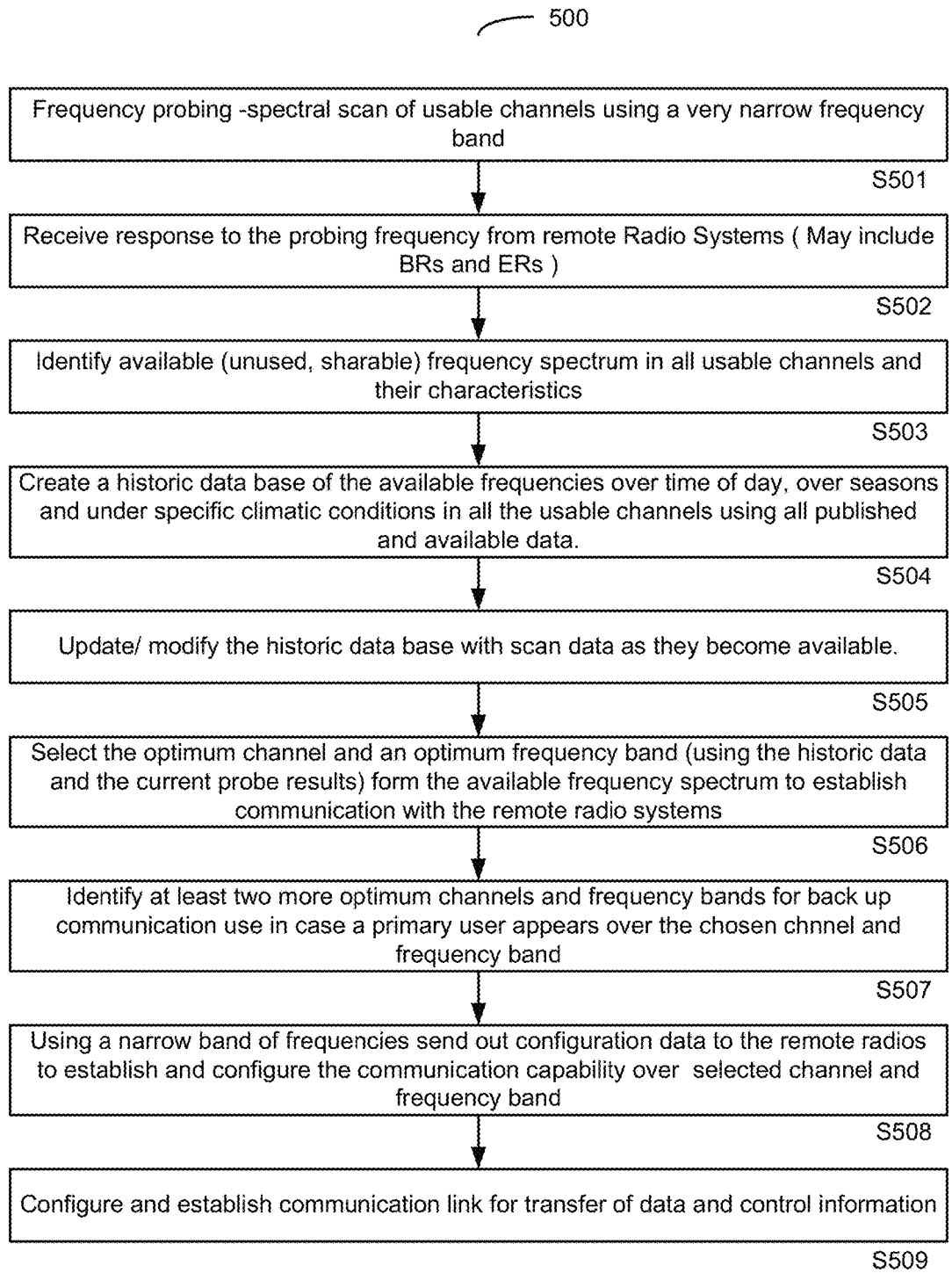
FIG. 5 is an exemplary block diagram 500 of the sequence of steps for configuring a channel for communication in accordance with an embodiment of the invention.

FIG. 5 is a block diagram of an exemplary method for the configuration connection between the Base Radio 101 and End Radio 202. The exemplary method includes the following exemplary steps to complete configuration.

A very narrow frequency signal is used to probe/sweep the frequencies across the routes. The system will probe a wide range of frequencies and routes to identify a far end for connection. The narrow frequency probe signal and protocol used by a station that is the initiating station (IS), typically a BR to advertise its existence and identify end radio systems typically ERs. The probe frequency is used to scan the frequencies of the route and identify the available open frequency bands which can be used by the secondary user and identify end points that exist. The characteristics of the available frequencies in the route are also assessed using the probe frequency and the response to the probe (block S501).

The IS receives response from the remote stations (typically ERs) acknowledging the possibility of connection over the specific frequency bands (block S502).

The response also enables assessment of the characteristics of the available frequency bands of the channel. The system logs findings of frequency availability and characteristics (block S503).

This includes historic data of the available frequencies over time of day, over seasons and under specific propagation conditions in all the usable channels using all published and available data. This will also include the data on typically (free) available bands in the channels over day and night times. This data is stored within the memory of the radio system (block S504).

The system then updates and modifies the historic data base with recent probe/scan data of the frequency bands within the routes as they become available from the probe/sweep (block S505).

Using the current probe data and the historic data collected select an optimum frequency channel form the available frequency spectrum to establish communication with the remote radio systems (block S506).

Identify two or more optimum channels frequencies within the available bands for back up communication use in case a primary user appears over the chosen channel and frequency will require the secondary (ER or BR) to move from the current frequency band (block S507).

Using the selected frequency, the IS sends out configuration data to the remote radios ERs to establish and configure the communication capability over selected channel and frequency by establishing a key and call sign for each ER connected (block S508).

Complete Configuration of the channel and establish communication link for transfer of data and control information (block S509).

Figure 6:
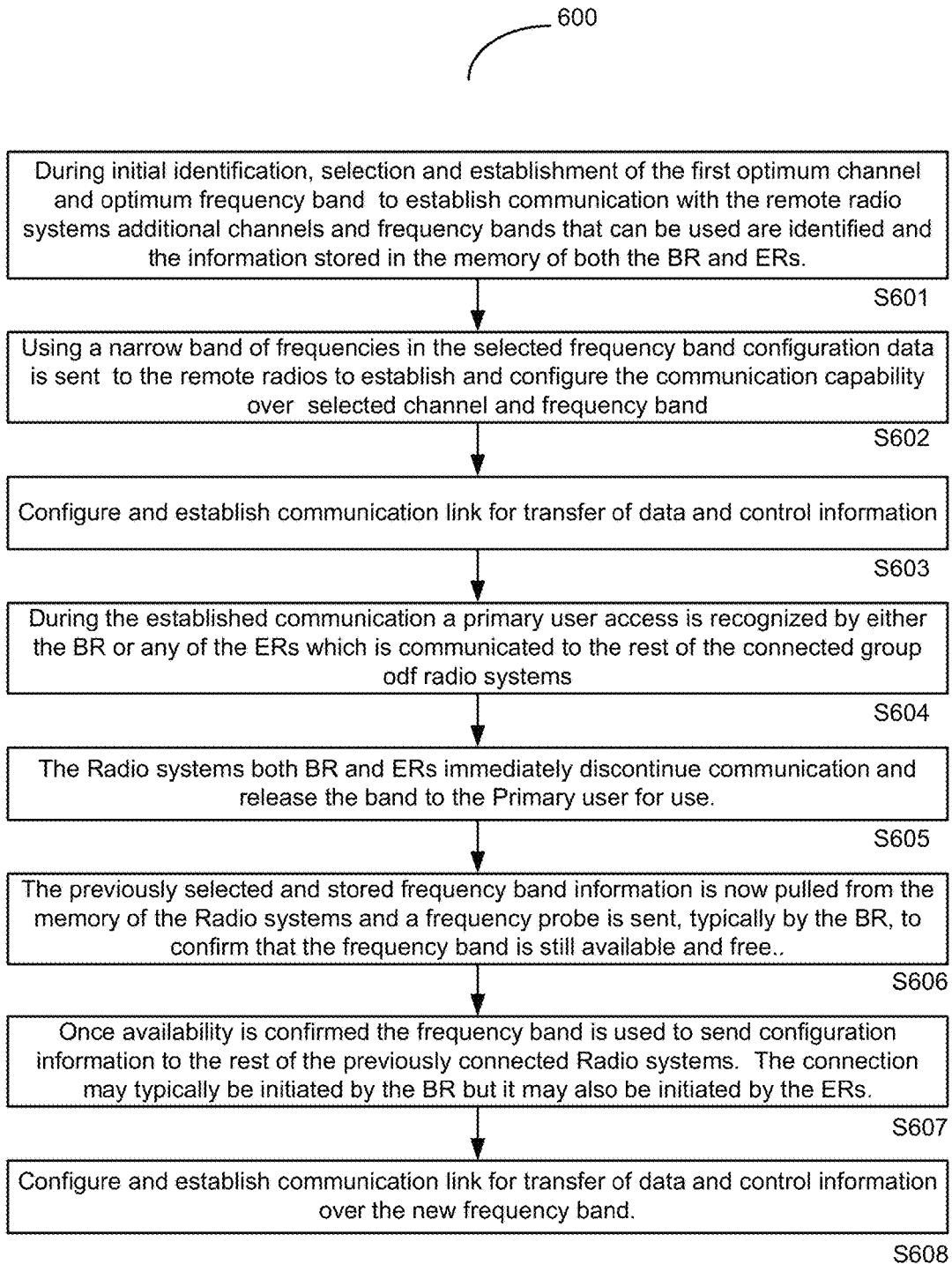
FIG. 6 is an exemplary block diagram 600 of the steps of an embodiment of the current invention where a primary communication user is identified over the communication frequency channel being used, which mandates movement of the secondary user to a different frequency in accordance with an embodiment of the invention.

FIG. 6 shows a block diagram 600 of an exemplary method for moving the communication channel to an alternate channel when a primary user is identified over the used frequency. In a shared spectrum use, it is mandatory for the secondary user to give priority for use to any primary users identified. This mandates that the secondary user moves from the frequency being used where the primary user is identified to a different available frequency, releasing the original frequency for use by the primary user.

As explained above (block 506), during initial identification, selection and establishment of the first optimum route and optimum frequency to establish communication with the remote radio systems, additional channels and frequency bands that can be used as alternate connection and communication frequency to establish communication are identified and the information stored in the memory of both the BR and ERs (block S601).

Using the identified optimum frequency within the selected route configuration data and information are sent to the remote radios, typically ERs, by the IS, typically BR, to establish and configure the communication capability over selected channel and frequency (block S602). A call sign and Key may be established during connect operation.

The method continues by configuring and establishing the communication link for transfer of data and control information using the information transferred the BR and ERs. The link is used to establish communication for transfer of data and control information (block S603).

If a primary user accessing the frequency is recognized by either the BR or any of the ERs during the communication or connect time, that information is communicated to the rest of the connected group of radio systems to enable them to prepare to shut down and move to alternate frequency that is not in use (block S604).

The radio systems—both BR and ERs—immediately discontinue and shut down the communication and the connections thereby releasing the frequency channel to the primary user as mandated by the shared spectrum rules (block S605).

The previously selected and stored frequency band information is now pulled from the memory of the radio systems and a frequency probe is sent to confirm that the frequency channel is still available and free and confirm the connection characteristics of the channel and its capability to connect to the rest of the radio systems (mainly ERs) (block S606).

Once availability and characteristics are confirmed, the selected frequency channel is used by the IS (typically BR) to send configuration information to the rest of the previously connected Radio systems (mainly ERs) (block S607). The connection may typically be initiated by the BR but it may also be initiated by the ERs.

The method continues by configuring and establishing the communication link for transfer of data and control information over the new channel frequency as previously done with the first channel frequency (block S608).

Figure 7:
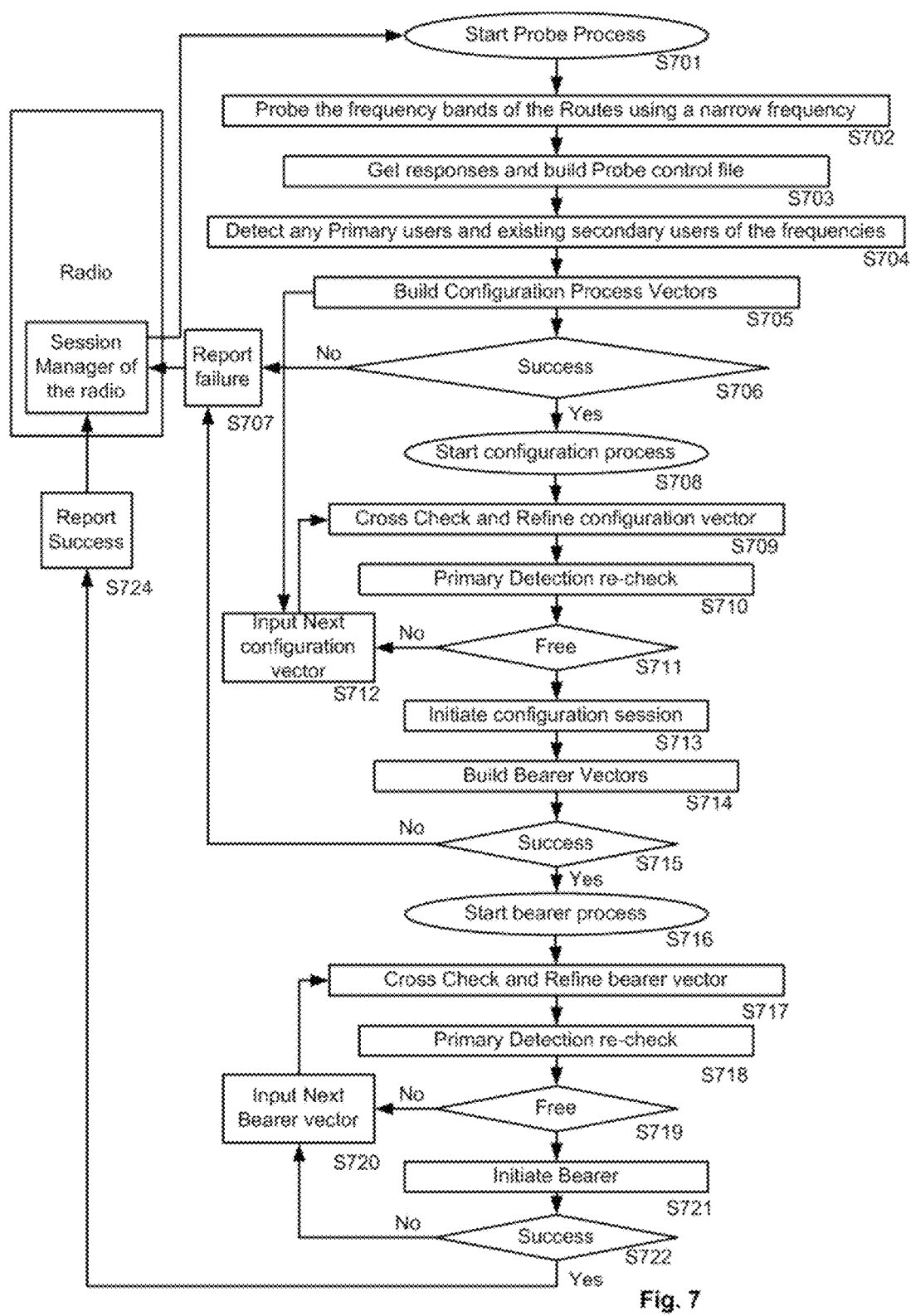
FIG. 7 is an exemplary flow chart 700 of the set-up procedure of the system for communication using shared spectrum in accordance with an embodiment of the invention.

FIG. 7 is an exemplary flow chart 700 of the set-up operation of a communication channel according to one embodiment of the invention.

When a communication channel between an initiating station (IS) radio, typically a base station radio (BR) and end point radio (ER) has to be set up the system under control of the session manager of the IS follows the set up procedure detailed in the flow chart 700 of FIG. 7.

Under instruction from the session manager a probe process is started to identify the usable free frequency channels available, the characteristics of the channels within the chosen route (block S701).

The frequencies of the route are probed using a narrow frequency (block S702).

The probing process provides information regarding the free channels that are available for communication and their characteristics (block S703). In addition, responses to the probe frequency provides availability of the end points over the frequencies.

The probing process also identifies the existing frequency channels over which primary and other secondary users exist (block S704).

Based on the information received, a set of configuration vectors are built (block S705).

The success of the process is checked (block S706).

If the process is not successful, a failure of process report is sent to the session manager for analysis and re-start of the process (block S707).

If the probe process is a success, then the system proceeds to the configuration process. The configuration process uses a wider frequency channel to establish connection with the end point radios (ERs) and configure the ERs for establishing a communication channel (block S708).

A configuration vector from the set of configuration vectors built is chosen, cross checked for correctness, and refined for use (block S709).

A re-check is conducted to see that the configuration channel to be used is not being used by any primary users (block S710). This also ensures that no primary users have started using the chosen frequencies during the processing period.

If a primary user is identified over the frequency, the check returns a "not free" response (block S711).

Then, a new configuration vector is loaded into the configuration process from the build vector set (block S705) for the cross check and refinement (block 709) and primary detection re-check (block S710). This process is repeated until a usable vector is chosen from the vector set (block S712).

If the primary detection re-check indicates that the frequencies chosen for configuration are free then the configuration session is started (block S713).

A set of bearer vectors are built that use the free frequency channels recognized (block S714).

The process continues by checking if the configuration process is successful in establishing connections and building the bearer vectors (block S715).

If the process is found to be unsuccessful, then a failure report is sent to the session manager for analysis and to take any further action (block S707).

If the configuration process is successful, then the bearer process establishes communication over the bearer vector chosen is initiated (block S716).

The chosen bearer vector is cross checked and refined for use (block S717).

Before starting the connection, a primary re-check is initiated to ensure that no primary users are present over the chosen frequency (block S718).

The process continues by evaluating a primary user re-check (block S719).

If the re-check fails and a primary user is identified over the bearer vector, then a new vector is loaded from the generated bearer vectors in step S715 (block S720).

The steps (block S717 to block S719) are repeated until a successful vector free of a primary user is identified, at which the bearer is initiated (block S721).

The bearer initiation process is checked for successful completion (block S722).

If the bearer initiation process is not successful. a new vector is chosen from the generated bearer vectors (block S715) and loaded into the bearer process to repeat steps (block S717 to block S722).

If the bearer initiation process is successful, the success is communicated to the session manager for start of data communication, thereby completing the communication set up and connection process (block S723).

One or more of the methodologies or functions described herein may be embodied in a computer-readable medium on which is stored one or more sets of instructions (e.g., software). The software may reside, completely or at least partially, within the storage module, as described above, and/or within the processing module during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the invention. The term "computer-readable medium" shall accordingly be taken to include, but not be limited to, solid-state memories, and optical and magnetic media.

Embodiments of the invention have been described through processes or flow diagrams at times, which are defined by executable instructions recorded on computer readable media which cause a computer, microprocessors or chipsets to perform method steps when executed. The process steps have been segregated for the sake of clarity. However, it should be understood that the steps need not correspond to discreet blocks of code and the described steps can be carried out by the execution of various code portions stored on various media and executed at various times.

Although a number of possible implementations have been described, these are presented merely for the sake of explanation and teaching, and are not limiting. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method of using a shared spectrum for establishing communication between an initiating radio and a remote end radio comprising:
    identifying, using the initiating radio, the remote end radio from a plurality of remote and radios;
    selecting and establishing an optimum communication connection link and route type, between the initiating radio and the remote end radio, from a ground wave (GW), a near vertical incidence skywave (NVIS), or a Meteor Burst/Scatter (MB/S) route type;
    wherein establishing the communication connection link comprises:
        transmitting, by the initiating radio, a beacon over a configuration band frequency vector wireless link;
        receiving a connection request from the remote end radio over the configuration band frequency vector wireless link in response to the beacon; and
        configuring the optimum communication connection link between the remote end radio and the initiating radio, wherein configuring the optimum communication connection link comprises:
            selecting a first usable free frequency band within the shared spectrum from the optimum communication route type;
            monitoring available free usable frequency bands within the shared spectrum and continuously identifying at least a second usable free frequency band and a third usable free frequency band within the optimum communication route;
            continuously monitoring the established communication connection link to determine whether a primary user is using the established communication connection link; and
            switching to the second usable free frequency band or the third usable free frequency band if the primary user is detected in the established communication connection link.

2. The method of claim 1, wherein the method efficiently uses shared spectrum for terrain independent and time insensitive communications for control communication and control of sensors in remote areas.

3. The method of claim 1, further comprising:
    probing available frequencies and routes at a probe frequency and receiving a response from the remote end radio.

4. The method of claim 3, further comprising selecting an optimum route type and the first usable free frequency band within the optimum route based on the received probe response.

5. The method of claim 3, further comprising logging data comprising available frequencies over time of day, over seasons and under specific propagation conditions.

6. The method of claim 3, further comprising updating a log of data comprising available frequencies over time of day, over seasons and under specific propagation conditions based on the probing.

7. The method of claim 6, wherein the response to probing, the updated log of data and publically available data of route characteristics are combined to choose the optimum route.

8. The method of claim 7, further comprising receiving and using historical data and data from nearby connections for selecting the optimum communication link.

9. The method of claim 1, wherein the initiating radio is a base station radio.

10. The method of claim 1, wherein both initiating radio and end radio are similar radios.

11. The method of claim 1, further comprising configuring the optimum connection link.

12. The method of claim 1, further comprising using one of the three route types within the shared spectrum to optimize connection between base station radio and end radios enabling optimized connectivity.

13. The method of claim 12, wherein the three route types comprise ground wave transmission and reception, near vertical incidence sky-wave (NVIS) and meteor burst/scatter (MB/S).

14. The method of claim 1, further comprising hierarchically regulating communication speeds depending on the channel conditions to provide reliable communication.

15. A system for terrain independent communication for machine control applications in remote locations, the system comprising:
    a plurality of ruggedized cognitive radios, wherein each of the plurality ruggedized cognitive radios is configured to establish a connection link with any other ruggedized cognitive radios of the plurality of ruggedized cognitive radios, wherein the plurality of ruggedized cognitive radios comprises:
- at least one ruggedized radio configured as a base station radio; and
- a plurality of ruggedized end radios, each of the plurality of end radios connected to at least one data collection device, wherein the at least one ruggedized base station radio is configured to:
- transmit a beacon over a configuration band frequency vector wireless link;
- receive a connection request from the remote end radios over the configuration band frequency vector wireless link in response to the beacon;
- select a communication route type and a usable frequency band within a shared spectrum;
- select and establish an optimum connection link between the ruggedized base station radio and any of the plurality of ruggedized end radios at a first usable free frequency within the usable frequency band;
- monitor available shared frequency spectrum and continuously identify a second usable free frequency and a third usable free frequency within the usable frequency band within the shared spectrum;
- continuously monitor the established communication link to determine whether a primary user is using the established communication link and switch to the second usable free frequency or third usable free frequency if a primary user is detected.

16. The system of claim 15, wherein the base station radio and the plurality of ruggedized end radios efficiently use the shared spectrum for terrain independent and time insensitive communications for control communication and control of sensors in remote areas.

17. The system of claim 15, wherein the base station is further configured to:
- probe available frequencies and routes at a probe frequency and receive a response from the remote end radio.

18. The system of claim 17, wherein the response indicates the available free frequency bands in the shared spectrum for connection.

19. The system of claim 18, wherein the base station is further configured to log data comprising available frequencies over time of day, over seasons and under specific propagation conditions.

20. The system of claim 18, wherein the base station is further configured to update a log of data comprising available frequencies over time of day, over seasons and under specific propagation conditions based on the probing.

21. The system of claim 17, wherein the base station is further configured to select the optimum communication link based on the probing.

22. The system of claim 21, wherein the base station is further configured to select the at least the second available free frequency and the third available free frequency based on the probing.

23. The system of claim 15, wherein the base station is further configured to configure the optimum connection link.

24. The system of claim 15, wherein the base station is further configured to use one of three route types within the shared spectrum to optimize connection between base station radio and end radios enabling optimized connectivity.

25. The system of claim 24, wherein the three route types comprise ground wave (GW), near vertical incidence skywave (NVIS) and meteor burst/scatter (MB/S).

26. The system of claim 15, wherein the base station is further configured to receive historical data and data from nearby connections.

27. The system of claim 15, wherein the base station is further configured to hierarchically regulate communication speeds depending on the channel conditions to provide reliable communication.

28. The system of claim 15, wherein the plurality of end radios are further configured to establish a connection to any one or more of the rest of the end radios and act as a repeater station when the base station is unable to establish a direct communication link to any of the one or more of the rest of the end radios without a direct communication link to the base station radio.

29. A radio system comprising
- an input/output interface;
- a management block comprising a network data interface and a primary supervisory manager;
- a control block comprising a system unit, a modulation control unit, a frequency spectrum control unit and an antenna control unit, wherein the frequency spectrum control unit is configured to continuously probe and identify available shared spectrum and characteristics of the available shared spectrum for use in routes to establish wireless connections;
- a storage module configured to store the available shared spectrum with time stamps and the characteristics;
- a communication platform comprising a session manager and a link manager to control the radio system to establish connections with other radio systems;
- a software defined radio configured to form a communication link; and
- a processing module configured to identify and select the optimum route and channel frequency for the connections with other radio systems.

30. The radio system of claim 29, wherein the input/output interface is connected to at least one sensor.

31. The radio system of claim 29, wherein the input/output interface is connected to the internet.

* * * * *